(No Model.) 3 Sheets—Sheet 2.

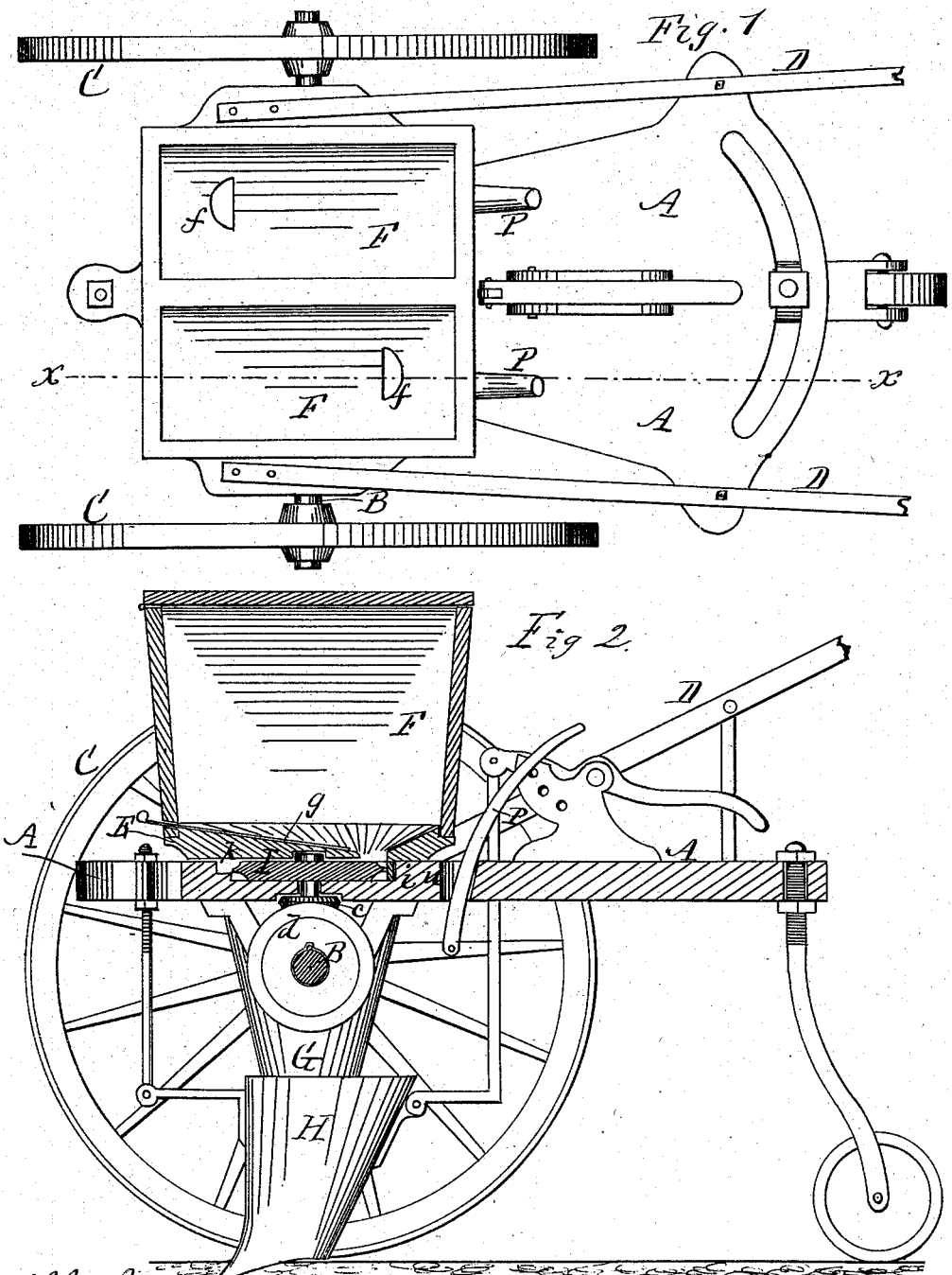

R. PLATMAN.
SEED PLANTER AND FERTILIZER DISTRIBUTER.

No. 288,483. Patented Nov. 13, 1883.

Attest.
John H. Hopkins
P. H. Costich

Inventor.
Robt Platman,
pr R. T. Osgood
atty.

(No Model.) 3 Sheets—Sheet 3.
R. PLATMAN.
SEED PLANTER AND FERTILIZER DISTRIBUTER.
No. 288,483. Patented Nov. 13, 1883.
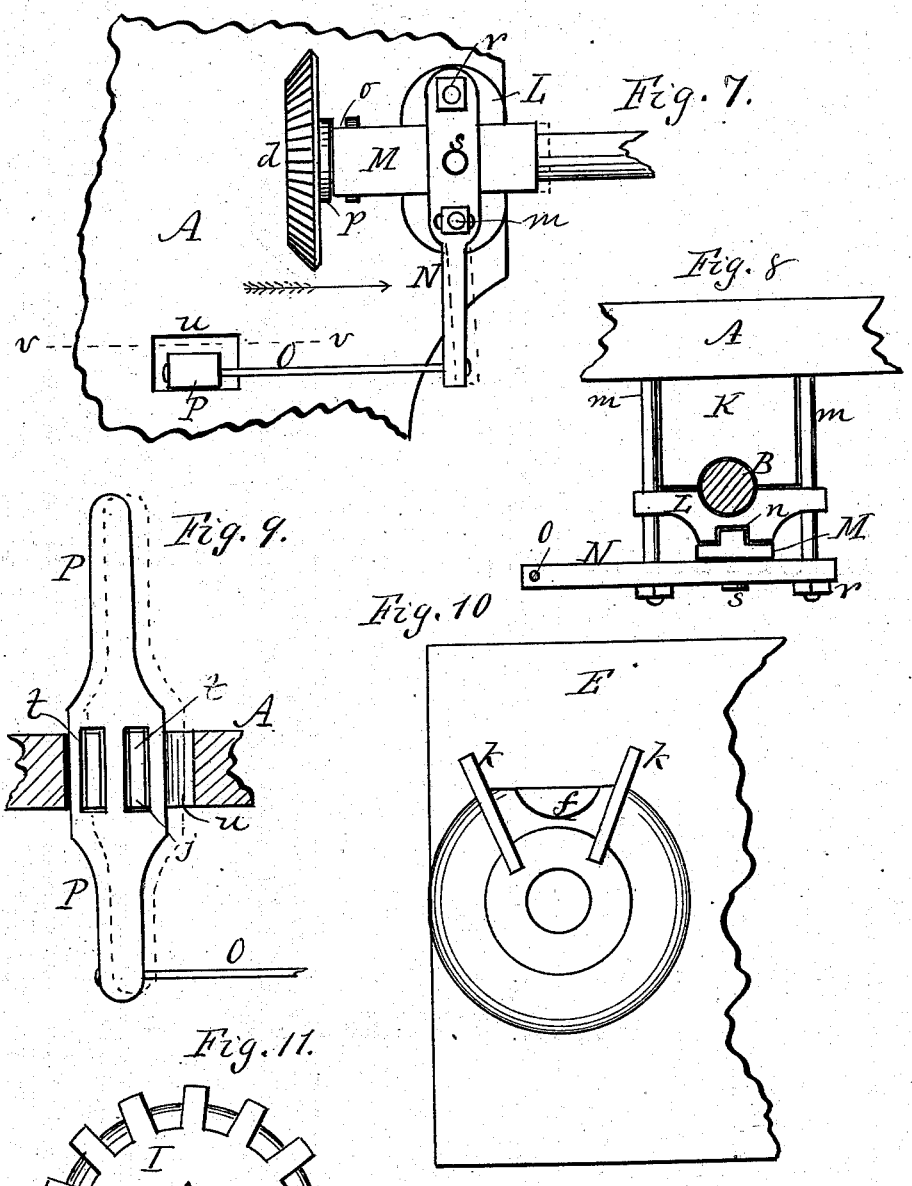

UNITED STATES PATENT OFFICE.

ROBERT PLATMAN, OF BELLONA, NEW YORK.

SEED-PLANTER AND FERTILIZER-DISTRIBUTER.

SPECIFICATION forming part of Letters Patent No. 288,483, dated November 13, 1883.

Application filed May 18, 1883. (No model.)

*To all whom it may concern:*

Be it known that I, ROBERT PLATMAN, of Bellona, Yates county, New York, have invented a certain new and useful Improvement in Seed-Planters and Fertilizer-Distributers; and I do hereby declare that the following is a full, clear, and exact description of the same, reference being had to the accompanying drawings, in which—

Figure 3:
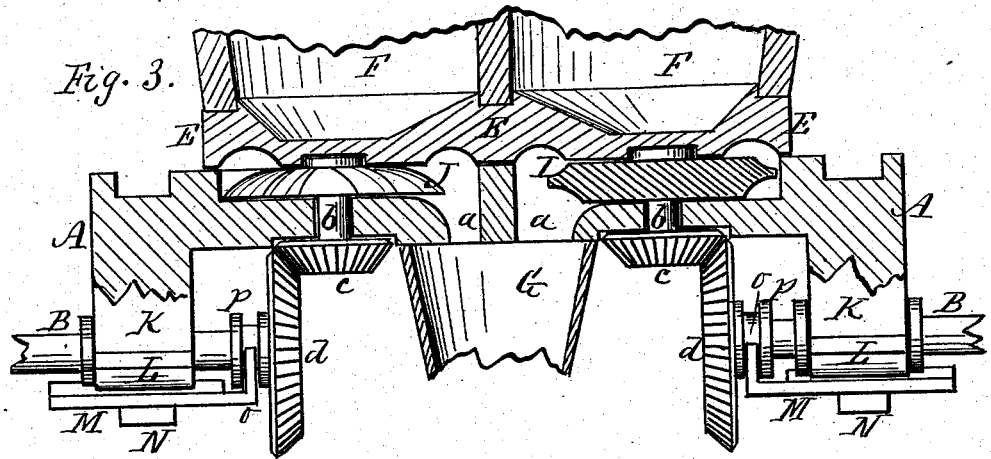
Figure 4:
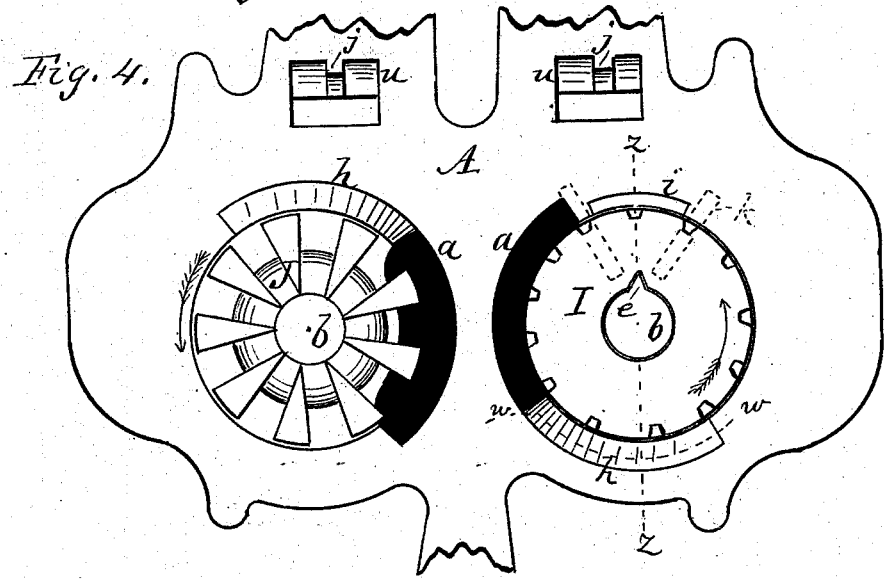
Figure 5:
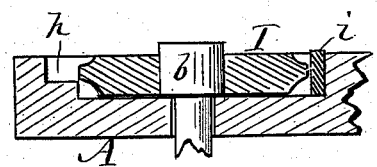
Figure 6:
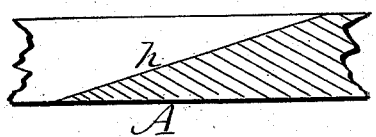

Figure 1 is a plan of the machine. Fig. 2 is a longitudinal vertical section of the same in line $x\ x$ of Fig. 1. Fig. 3 is a cross-section enlarged. Fig. 4 is a plan of the central portion of the bed-plate, showing the seed and fertilizer disks in place. Fig. 5 is a cross-section in line $z\ z$ of Fig. 4. Fig. 6 is a section in line $w\ w$ of Fig. 4, showing more particularly the inclined circumferential channel around the seed-disk. Fig. 7 is a bottom or under view of a portion of the bed-plate, showing more particularly the devices for disengaging the gears. Fig. 8 is an elevation of the gear-disengaging devices, looking in the direction of the arrow, Fig. 7. Fig. 9 is a section in line $v\ v$ of Fig. 7, showing the method of adjusting the lever P in its slot in the bed-plate. Fig. 10 is a bottom or under view of the hopper-plate which rests above the bed-plate, and showing more particularly the rubber packings which rest over the seed-disk. Fig. 11 is a plan view of the seed-disk for planting large seeds.

In general form and arrangement this invention resembles that for which I obtained patent February 6, 1883. The invention consists in the construction and arrangement of parts, hereinafter more fully described.

In the drawings, A shows the bed-plate or main frame, mounted on two separate axles, B B, and having two supporting-wheels, C C. The machine is propelled by two handles, D D, attached to the bed-plate; or, if desired, it may be drawn by power.

E is a hopper plate or bottom, which is attached removably on top of the bed-plate, and between these two plates are located the seed and fertilizer disks or droppers.

F F are two hoppers mounted on top of the hopper-plate—one containing the seed and the other the fertilizing material; and when the seed and fertilizer are dropped they meet in a common discharge-spout, G, under the center of the bed-plate, and thence pass into the drill-tooth H, arranged in a manner similar to that described in my aforementioned patent.

I is the seed-disk, and J the fertilizer-disk, located in cavities or sockets between the bed-plate and hopper-plate. They revolve toward a common center and discharge into central ports or passages, $a\ a$, through the bed-plate, that lead down to the discharge-spout G, as shown most clearly in Figs. 3 and 4. The disks are mounted on short shafts $b\ b$, and receive motion by bevel-pinions $c\ c$ on said shafts, which engage with bevel-gears $d\ d$ on the axles B B. The disks are fed from the hoppers through passages $f\ f$ in the hopper plate or bottom, and slides $g\ g$ are used above to gage the flow.

My invention is as follows: Outside of each of the disks I J, in the bed-plate, is an inclined circumferential channel, $h$. (Shown most clearly in Figs. 4, 5, and 6.) It starts at a point opposite from the point where the seed enters the disk, and then inclines downward and inward till it strikes the opening $a$ at the bottom of the bed-plate. The incline starts from the top and ends at the bottom, as shown in the sectional view, Fig. 6, and it follows the circle of the disk all the way. This inclined groove forms a chute, to discharge such seed as is not properly discharged from the pockets of the disk into the opening $a$. The seed, as it is carried around beyond the opening, falls off gradually into the inclined chute, and then slides back into the discharge-opening, thus preventing the seed from passing back under the disk, clogging the same and getting ground up, which would be the case if the chute were not provided. The natural rise of the chute will scrape the seed off from the edge of the disk. The same arrangement is used around the fertilizer-disk. A plan of the arrangement is shown in Fig. 4.

$i$, Figs. 4 and 5, is a thin piece of rubber set up edgewise in a cavity or offset notch of the bed-plate, and in close contact with the edge of the seeding-disk I, its top standing so high that when the hopper-plate E is pressed down upon it it will make a close packing on top, and the strip will make a close packing against the edge of the disk, so that the seed can escape neither over the top nor beneath.

k k are two similar strips of rubber set into slots in the under side of the hopper-plate E, and when the hopper-plate is in place on the bed-plate these strips press down on top of the seeding-disk and prevent the seed escaping either to right or left, but confine it, as it were, in a small chamber on top of the seed-disk and directly below the opening f. The seed, however, that fills the pockets of the disk can pass out under the packing toward the discharge-opening a.

Fig. 10 is a bottom view of the hopper-plate, showing the rubber strips inserted in the groove, and the dotted lines at the right in Fig. 4 show the position of the packing-strips as they rest over the top of the disk on each side of the feed-opening from the hopper above. If desired, a small filling-block, of wood, may be used under the seed-disk. The seed-disk is made removable from its shaft b, so that, when desired, another disk with larger or smaller pockets may be substituted in its place. This is done by placing it loosely on the upper end of the shaft and using a spline or feather, e, to make it revolve.

A disk with fine pockets is shown in Fig. 4, and one with coarse pockets in Fig. 11. In Fig. 5 the disk is shown with pockets of different sizes on opposite sides, and it can be changed by simply inverting it. The concave of the hopper-plate, which fits over the fertilizer-disk, may be provided with three or more small projecting ribs, which take the contact of the top of the disk and prevent the great friction that would occur if the top of the disk bore on the whole surface of the concave.

The axles B B are mounted in bearings K K, which project down from the under side of the bed A, and are covered by caps L L on the under side. The caps are held in place by bolts m m, Fig. 8.

M is a slide forming a clutch, which slides forward and back in a groove, n, of the cap, and has at its inner end a clutch, o, which fits in a groove of the hub p of the bevel-gear d. By sliding the clutch out and in, the bevel-gear will be correspondingly engaged with and disengaged from the bevel-pinion c. To allow this to be done, the wheel d slides forward and back on its shaft, and is made to turn with the shaft by being feathered thereon.

N is a lever, pivoted at r, and having a hole which receives a pin, s, projecting down from the slide M.

O is a bent rod attached to the outer end of the lever N, thence extending to and connected with the lower end of a lever, P. By throwing the lever P sidewise one way or the other it will be seen that the rod O will operate on the lever N, and the latter upon the slide M, and the latter upon the gear-wheel d, as before described. The lever P is provided with two slots, t t, as shown in Fig. 9, and the lever passes through a socket, u, in the bed-plate A, one end projecting above the plate and the other below. The lever is loose in the socket, and the latter is provided with a central rib, j, of such size as to enter either one of the slots t in the lever. The socket in which the lever rests is of such size that the lever can be pressed forward sufficiently to relieve one slot of the rib and allow the other to receive it, thus shifting the lever from one side to the other of the socket, as indicated by the dotted lines, Fig. 9. This movement is sufficient to throw the gears into and out of engagement, as before described. A set of these attachments is used on each side of the machine, so that the gearing can be disengaged on either side independently of the other.

By the use of the lever P, slotted as described, the gears can be engaged and disengaged and held in either position, as the slots lock with the rib j, and obviate the use of extra attachments for holding the parts locked.

Having described my invention, what I claim as new, and desire to secure by Letters Patent, is—

1. In a seed-planter and fertilizer-distributer, the combination, with the seeding or fertilizer disk or dropper, of a circumferential and inclined chute or channel, h, on the side opposite from the induction-opening leading to the disk, said chute surrounding the edge of the disk and leading to the discharge-opening for dropping the material, as herein shown and described.

2. In a seeding-machine, the combination, with the seeding-disk I, of the vertical rubber strip i, packing the edge of the disk under the induction-opening, and the rubber strips k k, packing the top of the disk on each side of the induction-opening, as herein shown and described.

In witness whereof I have hereunto signed my name in the presence of two subscribing witnesses.

ROBERT PLATMAN.

Witnesses:
J. C. SIMONS,
B. M. GOLDSMITH.